(12) United States Patent
Yamada et al.

(10) Patent No.: US 6,754,272 B2
(45) Date of Patent: *Jun. 22, 2004

(54) PICTURE SIGNAL PROCESSING METHOD AND APPARATUS, PICTURE SIGNAL RECORDING METHOD AND APPARATUS AND RECORDING MEDIUM

(75) Inventors: Makoto Yamada, Tokyo (JP); Miki Abe, Kanagawa (JP); Eiichiro Morinaga, Tokyo (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,165

(22) Filed: Mar. 30, 1999

(65) Prior Publication Data

US 2002/0196852 A1 Dec. 26, 2002

(30) Foreign Application Priority Data

Apr. 1, 1998 (JP) .......................................... 10-089102

(51) Int. Cl.⁷ ............................. H04N 7/12; G06F 15/16
(52) U.S. Cl. ............. 375/240.14; 375/240; 375/240.01; 375/240.12; 375/240.24; 709/247
(58) Field of Search ....................... 375/240.01, 240.12, 375/240.14, 240.24, 240.03; 709/247; 382/309; 345/634; 707/512; 348/469; 386/109; 370/471; 714/752

(56) References Cited

U.S. PATENT DOCUMENTS

| | | | | |
|---|---|---|---|---|
| 5,289,276 A | * | 2/1994 | Siracusa et al. | 348/469 |
| 5,535,008 A | * | 7/1996 | Yamagishi et al. | 386/109 |
| 5,537,409 A | * | 7/1996 | Moriyama et al. | 370/471 |
| 5,537,528 A | * | 7/1996 | Takahashi et al. | 707/512 |
| 5,552,832 A | * | 9/1996 | Astle | 375/240.24 |
| 5,559,557 A | * | 9/1996 | Kato | 375/240.03 |
| 5,612,900 A | * | 3/1997 | Azadegan et al. | 709/247 |
| 5,764,658 A | * | 6/1998 | Sekiguchi et al. | 714/752 |
| 6,167,083 A | * | 12/2000 | Sporer et al. | 375/240.01 |
| 6,243,103 B1 | * | 6/2001 | Takiguchi et al. | 345/634 |
| 6,282,330 B1 | * | 8/2001 | Yokota et al. | 382/309 |

* cited by examiner

*Primary Examiner*—Chris Kelley
*Assistant Examiner*—Allen Wong
(74) *Attorney, Agent, or Firm*—Frommer Lawrence & Haug LLP; William S. Frommer

(57) ABSTRACT

A picture signal processing method and apparatus, a picture signal recording method and apparatus and a recording medium, wherein an interval still picture is realized. To this end, a controller functionally performs the control of reading out from a user data region provided in a video sequence in a bitstream of the MPEG 2 standard the reproducing configuration of picture signals and the identification information for discriminating the relation with other recording units and of reproducing the picture signals in the reproducing configuration consistent with the discriminating information.

44 Claims, 15 Drawing Sheets

```
            b7      b6     b5    b4       b3     b2    b1    b0
   byte1 |startID|endID|  —  |Bit stream ID|   Sequence ID    | start ID
        1 b   FIRST VIDEO SEQUENCE OF MOVING AND STILL PICTURE SEQUENCE
        0 b
   end ID
        1 b   LAST VIDEO SEQUENCE OF MOVING AND STILL PICTURE SEQUENCE
        0 b
   Bit stream ID
        00b   MPEG2(MD DATA2)
        01b   MPEG2(MP@ML)
   Sequence ID
        000b  Movie sequence(Shot mode)
        001b  Movie sequence(Nomal mode)
        010b  Movie sequence(Long play mode)
        011b  Still sequence(Single picture)
        101b  Still sequence(Group of pictures)
        110b  Still sequence(Group of interval pictures)
```

| video sequence(){ | No.of bits | Mnemonic |
|---|---|---|
| next_start_code() | | |
| sequence_header() | | |
| if(nextbits()==extension_start_code){ | | |
| sequence_extension() | | |
| do{ | | |
| extension_and_user_data(0) | | |
| do{ | | |
| if(nextbits()==group_start_code){ | | |
| group_of_pictures_header() | | |
| extension_and_user_data(1) | | |
| } | | |
| picture_header() | | |
| picture_coding_extension() | | |
| extensions_and_user_data(2) | | |
| picture_data() | | |
| }while((nextbits()==picture_start_code)|| | | |
| (nextbits()==group_start_code)) | | |
| if(nextbits() !=sequence_end_code) { | | |
| sequence_header() | | |
| sequence_extension() | | |
| } | | |
| } while(nextbits() !=sequence_end_code) | | |
| }else{ | | |
| /*ISO/IEC 11172-2*/ | | |
| } | | |
| sequence_end_code | 32 | bslbf |
| } | | |

FIG.4

| group_of_pictures_header(){ | No.of bits | Mnemonic |
|---|---|---|
| group_start_code | 32 | bslbf |
| time_code | 25 | bslbf |
| closed_gop | 1 | uimsbf |
| broken_link | 1 | uimsbf |
| next_start_code() | | |
| } | | |

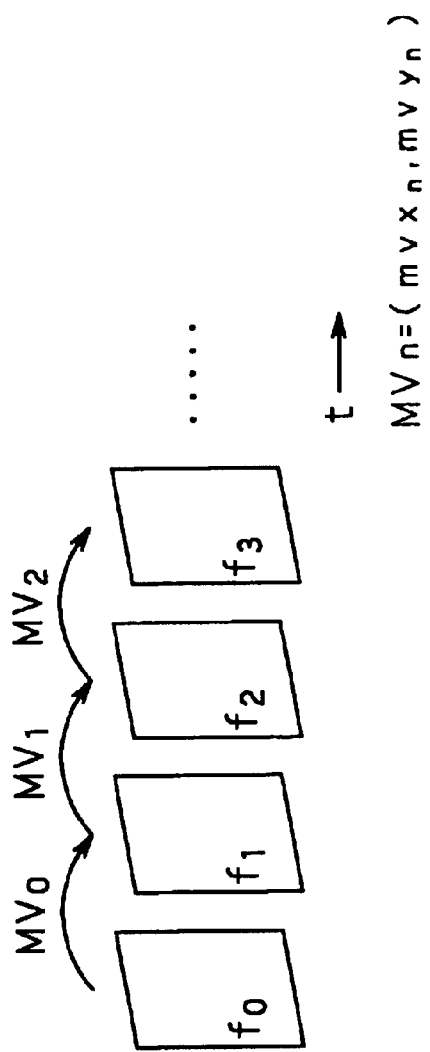
$MV_n = (mvx_n, mvy_n)$
FIG.13A
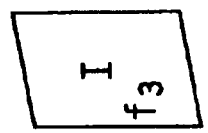
EXAMPLE:
$|mvx_0 + mvy_1 + mvx_2| \geq mvx_{ref}$
FIG.13B

PICTURE SIGNAL PROCESSING METHOD AND APPARATUS, PICTURE SIGNAL RECORDING METHOD AND APPARATUS AND RECORDING MEDIUM

BACKGROUND OF THE INVENTION

1. Field of the Invention

This invention relates to a picture signal processing method and apparatus, a picture signal recording method and apparatus and a recording medium relevant to the expression of a bitstream syntax of the MPEG (Moving Pictures Experts Group) 2 standard concerning a large-picture size still-picture, a high picture quality still picture, an interval still picture or a thumb-nail moving picture.

2. Description of the Related Art

The MPEG (Moving Pictures Experts Group) 2 is an encoding system used in broadcast or AV equipments, and which has become extremely popular as an information compression technique for pictures/speech/data.

Recently, there has been provided a high picture quality recording/reproducing apparatus having a CCD solid-state imaging device with a large number of pixels. It is occasionally desired to represent the still picture, imaged by such high picture quality recording/reproducing apparatus, in the form of a large-size still picture or a high picture quality still picture.

However, the recording/reproducing apparatus lacks in the degree of freedom in the size of representation because it is only possible to represent the still picture of a size determined in the MPEG 2 video standard.

For example, the maximum size picture that can be represented by the MP@ML (main profile/main level) of MPEG 2 is 720 (H) by 576 (V), so that, if a large-size still picture is to be represented from a still picture imaged by this high picture quality recording/reproducing apparatus, a separate hardware needs to be provided, thus raising the cost.

Also, in the method for representing the still pictures employing the MPEG 2 video standard, the frame intervals cannot be set optionally to, for example, one frame/second, one frame/minute or one frame/30 minutes.

SUMMARY OF THE INVENTION

It is therefore an object of the present invention to provide a picture signal processing method and apparatus, a picture signal recording method and apparatus and a recording medium, in which the recording/reproducing function for a still picture can be optionally set by a user for realizing a large-size still picture, an interval still picture or a thumb-nail still picture that cannot be represented in a frame provided in the MPEG 2 video standard.

According to the present invention, as described above, a set of frames, such as non-consecutive I-pictures of the video sequence, is utilized for realizing the large-sized still picture or the high quality still pictures that cannot be represented by the MP@ML (main profile/main level) of MPEG2, whereby it is possible to realize a desired large size still picture or panoramic synthesis without necessitating special hardware.

According to the present invention, the user is able to set the interval of still pictures optionally so that an interval still picture, a thumb-nail moving picture or panoramic synthesis can be realized. Moreover, since the reproducing time can be processed freely, music software can be formulated to reproduce consecutive still pictures to the accompaniment of music, thus improving the function of the recording/reproducing apparatus embodying the present invention.

In addition, since a sole panoramically synthesized picture is reproduced by sequentially imaging and interconnecting plural still pictures, panoramic imaging becomes possible using a routine CCD solid state imager. Since the amount of motion vector across different frames, such as I-pictures, is detected, and is encoded only if the amount of the motion vector exceeds the pre-set value, it is possible to improve the processing efficiency at the time of generating the panoramically synthesized picture in comparison with the case of using the totality of frames.

BRIEF DESCRIPTION OF THE DRAWINGS

FIG. 4 shows the structure of a video sequence.

FIG. 13 illustrates the motion vector.

DESCRIPTION OF THE PREFERRED EMBODIMENTS

Figure 1:
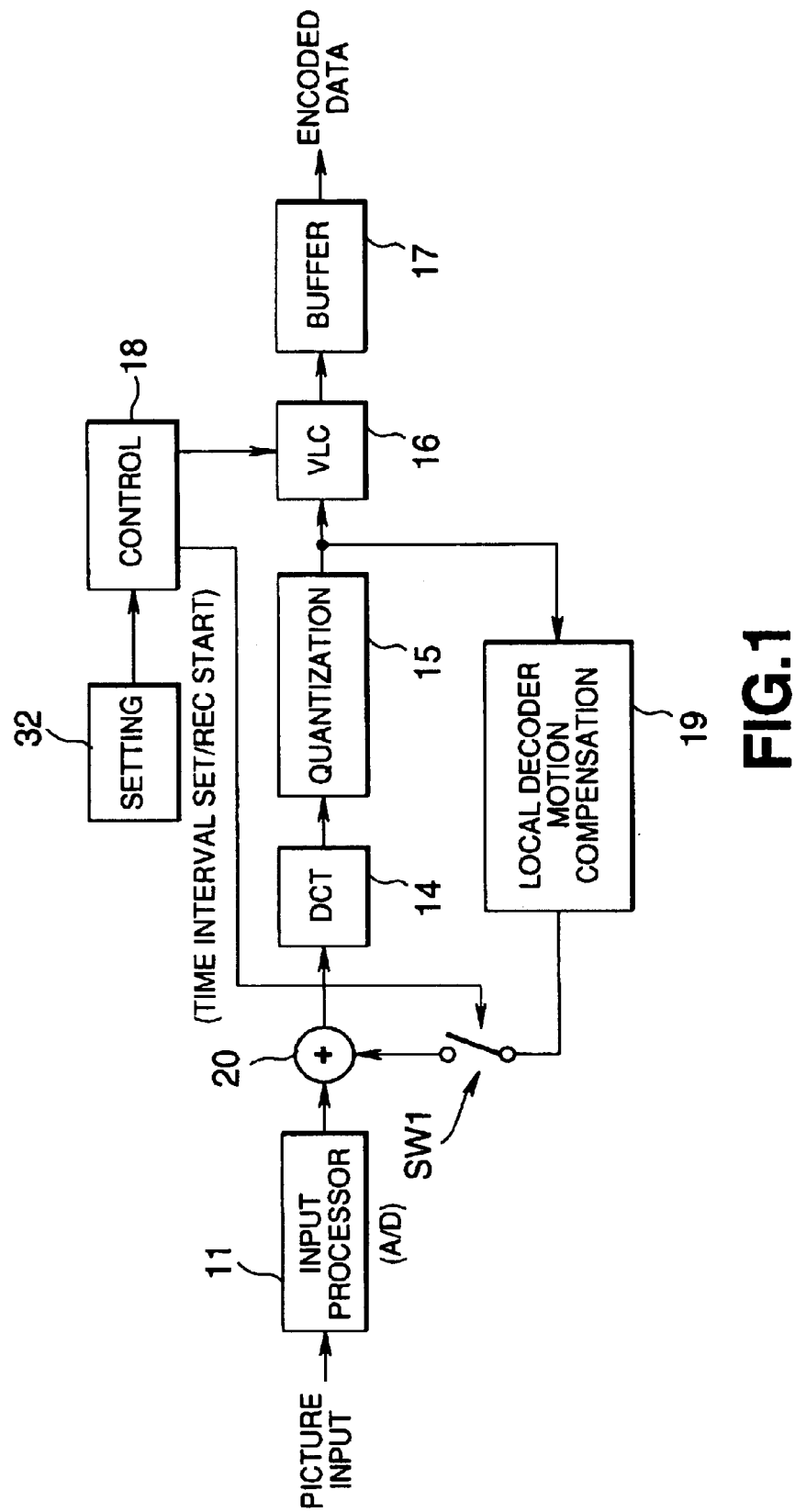
FIG. 1 is a block diagram showing the structure of an MPEG encoder.

Referring to the drawings, preferred embodiments of the present invention will be explained in detail.

Figure 2:
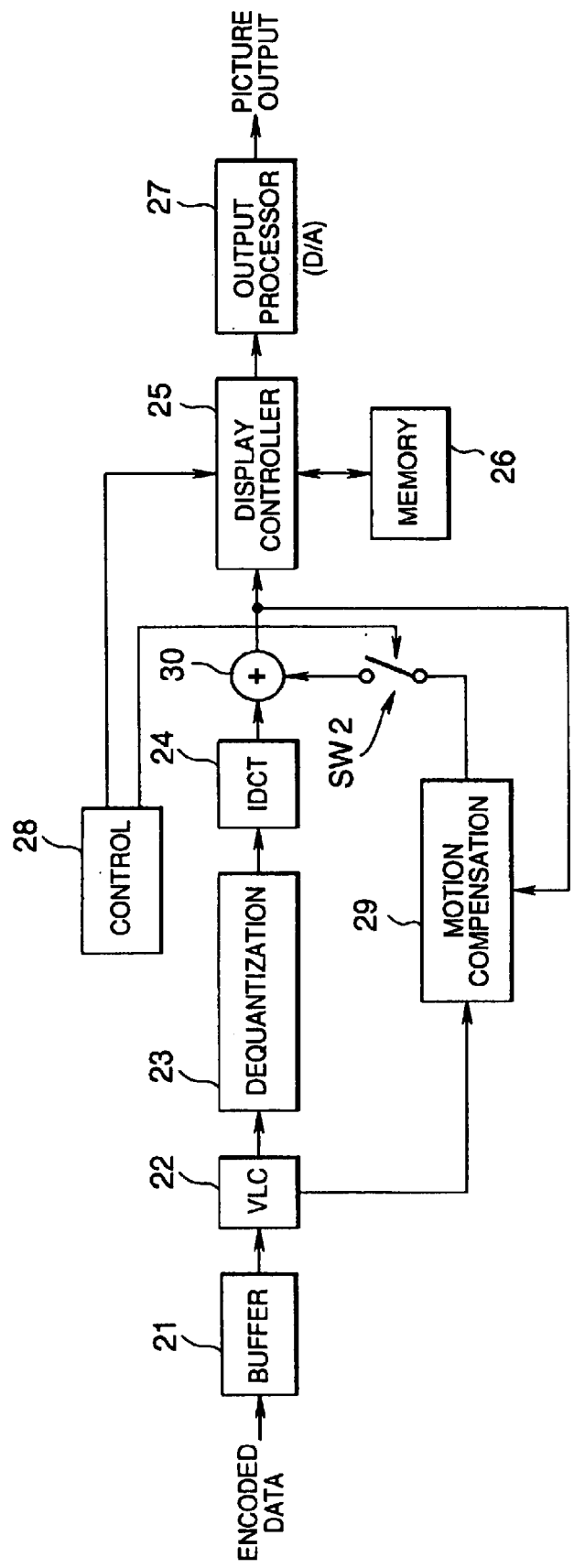
FIG. 2 is a block diagram showing the structure of a MPEG decoder.
Figure 3:
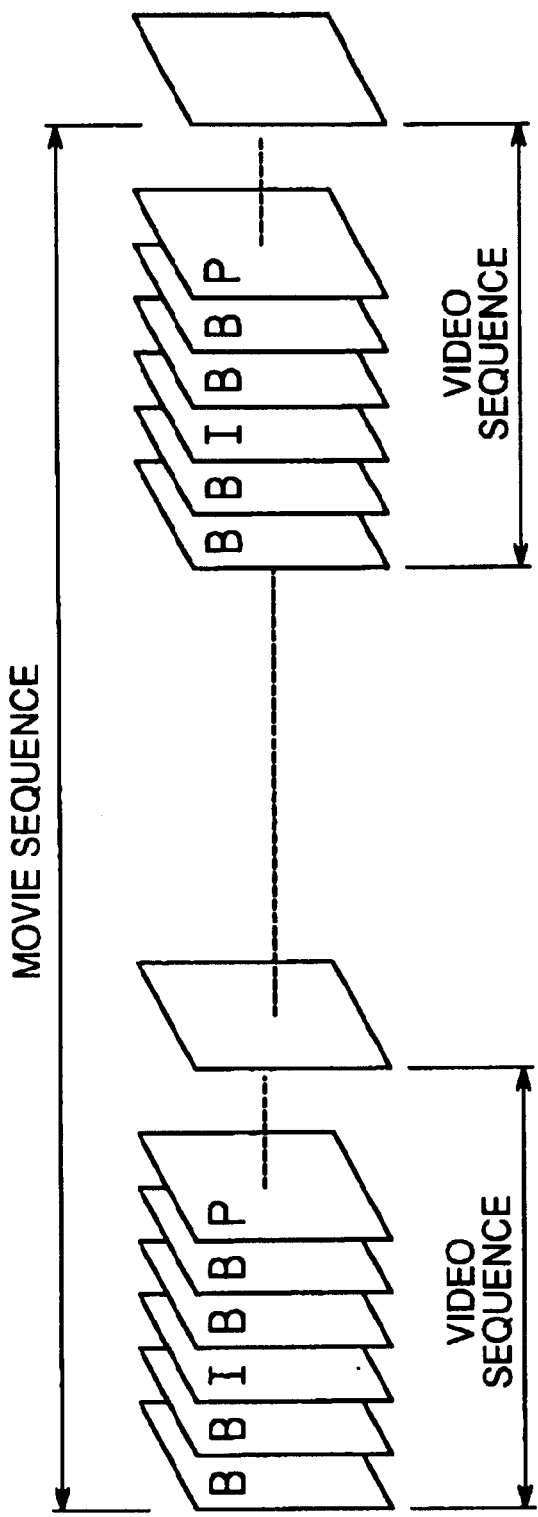
FIG. 3 shows the structure of a movie sequence.

As a present embodiment of the present invention, an MPEG encoder for encoding picture signals into a bitstream of the MPEG 2 (Moving Picture Experts Group Phase 2), as shown in FIG. 1, and an MPEG decoder for decoding the bitstream of the MPEG 2 standard into picture signals, as shown in FIG. 2.

Referring to FIG. 1, the MPEG 2 encoder includes an input processor 11 for processing an input picture in a pre-set fashion, an addition unit 20 for performing addition to data from the input processor 11, a DCT (discrete cosine transform) unit 14, for processing data from the addition unit 20 with DCT (discrete cosine transform), a quantizer 15 for quantizing DCT coefficients from the DCT unit 14, and a local decoder motion compensation unit 19.

The input processor 11 A/D converts the picture signals supplied thereto from outside to sequentially obtained frame data which are split on the macro-block basis and outputted. In a still picture, frame data are inputted only on the picture frame basis, and are all processed as I-pictures.

The addition unit 20 takes a difference between data from the input processor 11 and data obtained via a switch SW1 from the local decoder motion compensation unit 19. The DCT unit 14 performs DCT on data from the addition unit 20 to give DCT coefficients. The quantizer 15 quantizes the DCT coefficients from the DCT unit 14.

The local decoder motion compensation unit 19, used for producing a predicted picture for a P-picture or a B-picture, performs dequantization and inverse DCT on picture data supplied from the quantizer to effect motion compensation. The motion-compensated picture data is sent via switch SW1 to the addition unit 20 where a difference from the input picture is found. However, if only an I-picture is used, such as a still picture, the switch SW1 is turned off and an I-picture type is allocated to the input frame data.

The MPEG encoder includes a setting unit 32, a controller 18 for controlling various portions of the MPEG encoder, a variable length encoder 16 and a buffer 17 for transient data storage.

The setting unit 32 performs setting for time intervals or recording (Rec) start by input actuation.

The controller 18 performs comprehensive control on various portions of the present MPEG encoder. For example, the controller 18 controls the opening/closure of the switch SW1 and the processing in the VLC 16. This controller 18 can be designed as, for example, a so-called micro-computer made up of a CPU, ROM or a RAM.

The VLC 16 variable-length encodes the data from the quantizer 15, under control by the controller 18. The buffer 17 transiently holds the encoded data from the VLC 16 to output the encoded data as an output signal. The encoded data outputted from the buffer 17 is recorded in a recording/reproducing apparatus, not shown.

Referring to FIG. 2, the MPEG decoder includes a buffer 21 for transient storage of input encoded data, a VLD 22 for variable-length decoding the encoded data from the buffer 21, a dequantizer 23 for dequantizing data from the VLD 22, and an inverse DCT unit 24 for inverse DCTing the dequantized data from the VLD 22. The MPEG decoder also includes a motion compensation unit 29 for motion-compensating the picture data and an addition unit 30 for summing data from the inverse DCT unit 24 and from the motion compensation unit 29.

The encoded data, reproduced by the recording/reproducing apparatus, not shown, is transiently stored in the buffer 21. The encoded data from the buffer 21 are inputted to the VLD 22 where the macro-block encoded information is decoded.

The variable-length decoded data from the VLD 22 are decoded by the dequantizer 23 into DCT coefficients which are converted by the inverse DCT unit 24 into pixel spatial data.

The motion compensation unit 29 generates motion-compensated data based on the motion vector supplied from the VLD 22 and the picture data stored in a frame memory not shown, and which is read out from the frame memory. The motion-compensated picture data from the motion compensation unit 29 is routed via switch SW2 to the addition unit 30. During reproduction of the still picture, described above, the switch SW2 is turned off, that is, opened, so that only the I-picture is repeatedly reproduced.

The addition unit 30 sums data, inverse-DCTed by the inverse DCT unit 24, and the motion-compensated picture data from the motion compensation unit 29, to each other. Output data of the addition unit 30 is routed to the motion compensation circuit 29 and to the frame memory, not shown.

The MPEG decoder also includes a controller 28, for controlling various portions of the MPEG decoder, a display controller 25 for display-controlling data from the addition unit 30, a memory 26 for storing a picture, and an output converter 27 for converting data from the display controller 25 in a pre-set fashion to output the converted data as a picture output.

The controller 28 is a portion for supervising and controlling various portions of this MPEG encoder. The controller 28 performs control in connection with the opening/closure of the switch SW2 or with processing in the display controller 25 based on the data from, for example, the VLD 22.

The display controller 25 performs pre-set processing for picture data. Typical of the processing in the display controller 25 is synthesis of a large-size picture from plural pictures. This sort of processing for a picture will be explained subsequently. The memory 26 stores a picture under control by the display controller 25.

The output processor 27 outputs picture signals, which are D/A converted from picture data from the display controller 25, as output signals.

The processing of picture signals by the above-mentioned MPEG encoder and the MPEG decoder is now explained. The MPEG encoder and the MPEG decoder perform encoding/decoding for an MPEG standard bitstream of the picture signals.

In the MPEG 2, input data, such as picture/speech/data, are encoded in accordance with a bit rate. Also, a picture is split into m×n blocks which are orthogonal-transformed for concentrating the signal power for compressing the entire information volume.

The picture data, encoded into a bitstream in accordance with the MPEG 2 standard, assume a hierarchical structure from a sequence layer to a block layer.

That is, the bitstream according to the MPEG 2 standard is made up of a sequence layer of a group of pictures having a series of the same attributes, a group-of-pictures layer (GOP layer) as the minimum unit of the picture group as a random-accessing unit, a picture layer of the attributes common to a picture, a slice layer of the information common to a small-sized picture obtained on optionally splitting the sole picture, a macro-block layer of the information common to pixel blocks (macro-blocks) obtained on sub-splitting the slice layer, and a block layer of the transform coefficients per se.

The picture layer has, as its object, a 704 (H)×480 (V) picture of the NTSC system, in accordance with the main level main format.

The respective pictures are classified into an I-picture (intra-picture), a forward predictive-coded picture or a P-picture, predictively coded in the forward direction in the display sequence, and a bidirectionally predictive-coded picture or a B-picture, predictive-coded in both the forward and backward directions in the display sequence. These different pictures collectively make up a group-of-pictures (GOP) layer.

In a video sequence of the MPEG 2 system, the resolution etc cannot be changed. A MPEG2 video sequence begins with a sequence header and ends with a sequence end, and is made up of a sequence of B, B, I, B, B, P . . . pictures. The video sequence, as a minimum unit which modifies the resolution, represents a sole moving picture between the start and the end.

According to the present invention, a moving picture is represented as a moving picture sequence defined by a set of video sequences, that is as a movie sequence. A still picture is represented by defining a frame, such as an I-picture, by a video sequence, with a set of the frames being a set of still pictures. The set of video sequences as a still picture is a sequence of still pictures, that is a still sequence.

By utilizing the video sequence in this manner, plural sorts of the reproducing configurations for picture signals and the relation with other video sequences, that is plural modes containing moving and still pictures, are realized.

The reproducing configurations, as the modes of picture signals, can be discriminated by referencing to user data (user_data) as the information proper to the MPEG2 bitstream.

Specifically, user data (user_data) of the sequence header (sequence_header) of the video sequence of the MPEG2 bitstream, is utilized, as shown in FIG. 4. That is, the discriminating information is written in a byte 1 and a byte 2 of the user data area which can be defined on the sequence basis.

Figure 5:
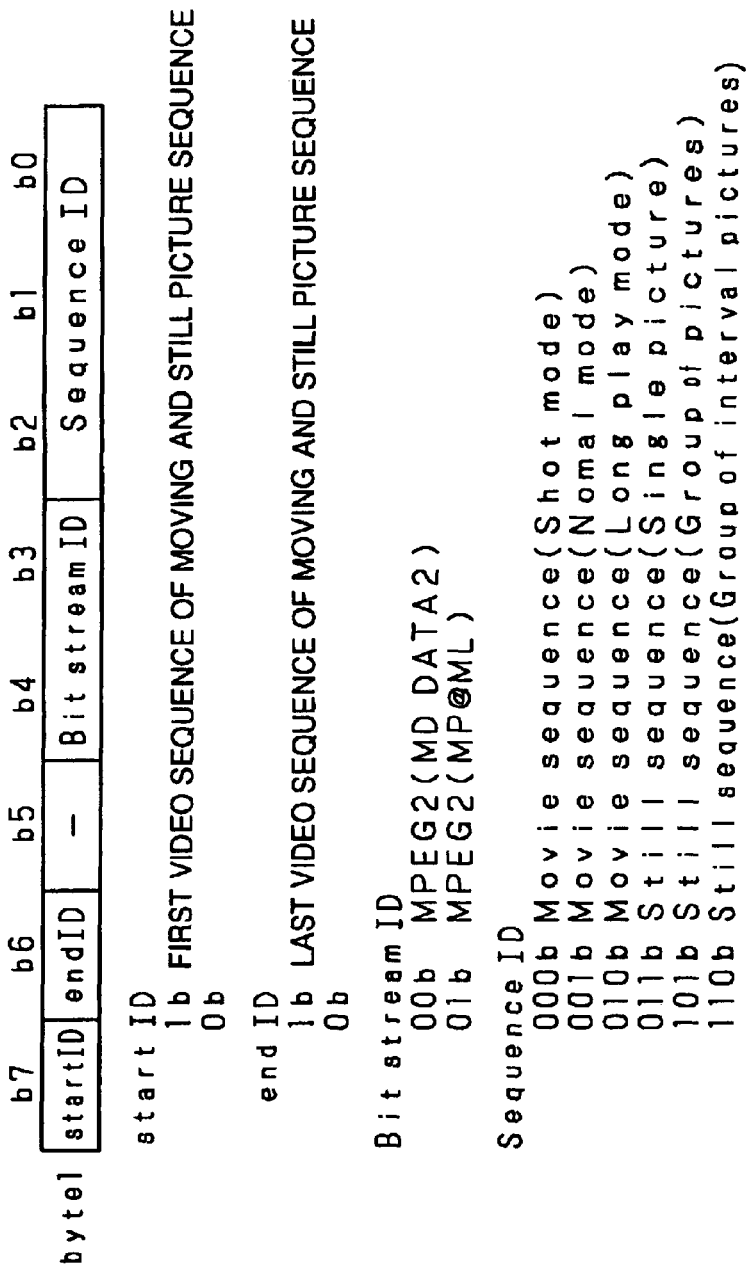
FIG. 5 shows the structure of user data.

The user data of the sequence header can be defined as shown in FIG. 5.

In the byte 1 in the user data, a start ID is the seventh bit b7, an end ID is the sixth bit, bitstream IDs are the third bit b3 and the fourth bit b4, and sequence ID is the second bit b2, a first bit b1 and the 0th bit b0. The fifth bit is reserved.

If the start ID is '1', the bitstream is defined as being the first video sequence of the movie sequence or the still picture sequence. If the end ID is '1', the bitstream is defined as being the last video sequence of the movie sequence or the still picture sequence. The trailing side 'b' of the numerical figure denotes that the binary representation is used.

If the bitstream ID is '00', the bitstream is defined as the first video sequence of the movie sequence or the still picture sequence. If the end ID is '1', the bitstream is defined as the last video sequence of the movie sequence or the still picture sequence. Also, the bitstream ID of '00' and the bitstream '01' are defined as denoting MPEG2 (MD DATA2) and denoting the MPEG2 (MP@ML), respectively.

That is, the bitstream ID '00' denotes that two frames are taken with the frame rate of 30 Hz, or that the range of representation is outside the MPEG 2 range, whereas the bitstream ID denotes that the range of representation is outside the MPEG2 standard, with the time interval being arbitrary.

As for the movie mode, it is a shot mode or the normal mode of the movie sequence if the sequence ID is '000' or '001', respectively. If the sequence ID is '010, the movie mode is the long play mode of the movie sequence.

It is noted that the movie sequence has the shot mode not in need of real-time reproduction, a normal mode in need of real-time reproduction, and the long play mode which is the long recording mode premised on the encoding of a progressive picture.

The shot mode is used when it is desired to effect compression at a high bit rate using e.g., a memory. The bit rate of the shot mode is 15 Mbps.

The normal mode is not completely pursuant to MP@ML of MPEG2. The average bit rate of the normal mode is 4 Mbps. The long play mode is the long time mode associated with the progressive mode, with the average bit rate being 1 Mbps or less.

Thus, the mode of the picture signals is discriminated by the user data of the MPEG2 bitstream.

The still picture mode of the picture signals will now be explained.

First, the interval still picture, obtained on imaging a still picture at a pre-set time interval, is explained.

It is occasionally desired to image a still picture at a pre-set time interval, such as every second, every five seconds or every minute.

In the present embodiment, a sole still picture is produced at the time of reproduction from a set of frames of moving pictures. These pictures can be regarded as being a set of related pictures and hence are collectively defined as a still picture sequence. The time interval can be freely set by the user to, for example, one second, one minute or thirty minutes.

Figures 6, 7:
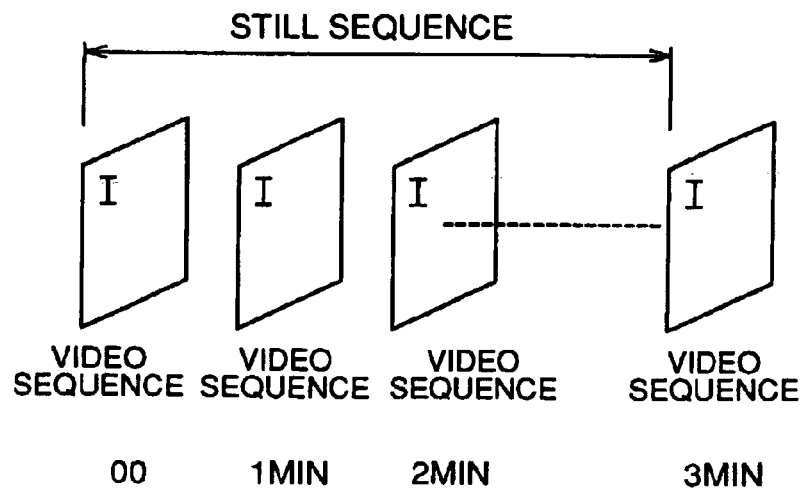
FIG. 6 shows a set of non-consecutive frames.
FIG. 7 shows the structure of a group-of-pictures header.

In setting the time interval, the time code (time_code) of the group-of-pictures header (group-of-pictures_header) in the video sequence is employed, as shown in FIG. 7. Since the frame, second, minute and hour can be recorded in this time code, all '00's are written for the first video sequence, using the frame etc, in order to record the vacant time until the next video sequence.

In this manner, a set of non-consecutive frames is used for time-interval imaging, as shown in FIG. 6. For example, in imaging every minute, a byte minute is used and '00' followed by 'one minute', 'two minutes' and 'three minutes' are inserted. Thus, the user is able to set the imaging time interval optionally.

It is also possible for the user to set the time interval on grouping and for the system to count the time interval to bury it automatically each time the shutter is pressed.

For reproduction, after the first picture is imaged, the time code is checked. If the time code reads 'one minute', the next one image is automatically reproduced. By processing the reproducing time, a music software reproducing the consecutive still pictures to the accompaniment of music can be formulated. This achieves feature-up of the recording/reproducing apparatus embodying the present invention.

As for the interval imaging, the long play mode of the movie sequence is used, so that the sequence ID is '110'.

The picture signal processing apparatus for realization of time-interval imaging is explained. This picture signal processing apparatus is equivalent to the MPEG encoder shown in FIG. 1 and to the MPEG decoder shown in FIG. 2 in which the switches SW1 and SW2 are closed. The respective portions of the MPEG encoder and the MPEG decoder are explained previously and hence are denoted by corresponding reference numerals and are not explained specifically.

Referring to FIG. 1, the MPEG encoder includes an input processor 11 for processing an input picture in a pre-set fashion, an addition unit 20, a DCT (discrete cosine transform) unit 14, for processing data from the addition unit 20 with a DCT to generate DCT coefficients, a quantizer 15 for quantizing DCT coefficients from the DCT unit 14, and a local decoder motion compensation unit 19 for processing output data of the DCT 14 with local decoding, motion compensation and with motion prediction to output the processed data to the addition unit 20. A switch SW1 provided on a path leading from the local decoder motion compensation unit 19 to the addition unit 20 is perpetually closed.

The MPEG encoder includes a setting unit 32 for performing pre-set setting, such as recording time interval setting or recording (Rec) start, a controller 18 for controlling various portions of the MPEG encoder, a VLC 16 for variable-length encoding quantized data from the quantizer 15 and a buffer 17 for temporarily holding the encoded data from the VLC 16.

Referring to FIG. 2, the MPEG decoder includes a buffer 21 for transient storage of encoded data, a VLD 22 for variable-length decoding the encoded data from the buffer 21, a dequantizer 23 for dequantizing data from the VLD 22, an inverse DCT unit 24 for inverse DCTing the dequantized data from the dequantizer 23, an addition unit 30 and a motion compensation unit 29 for motion compensating data from the VLD 22 to output the motion compensated data to the addition unit 30. A switch SW2 provided on a path leading from the motion compensation unit 29 to the addition unit 30 is perpetually closed.

The MPEG decoder includes a controller 28 for performing comprehensive control of the MPEG decoder, a display controller 25 for controlling the picture display, a memory 26 for storing images under control by the display controller 25 and an output processing unit 27 for processing data from the display controller to output the processed data as picture signals.

The thumb-nail moving picture is hereinafter explained. The thumb-nail moving picture is a thumb-nail for a moving picture which is a moving picture the picture size of which is reduced to reduce the overall information volume for use in picture retrieval.

In the thumb-nail moving picture, only I-pictures, for example, are extracted and formed into a small-sized picture for representation as a block of I-pictures. This is approximate to a so-called para—para caricature-like moving picture, although it is treated as a set of moving pictures.

The large-size still picture will now be explained. The large-size still picture is a split picture segment recorded on a disc obtained on splitting a large-size picture into four segments. With this large-size still picture, a large-size picture, exceeding the size prescribed in the MPEG2 video standard, is split into e.g., four picture segments at the time of recording by the high picture quality recording/reproducing apparatus.

For reproduction, these segments are collected to reproduce the large-size picture. Since a fill still picture cannot be obtained from the sole picture, four pictures are collected together to represent a sole large-size picture. That is, the large-size still picture is synthesized using a set of non-consecutive frames of the video sequence.

Figure 8:
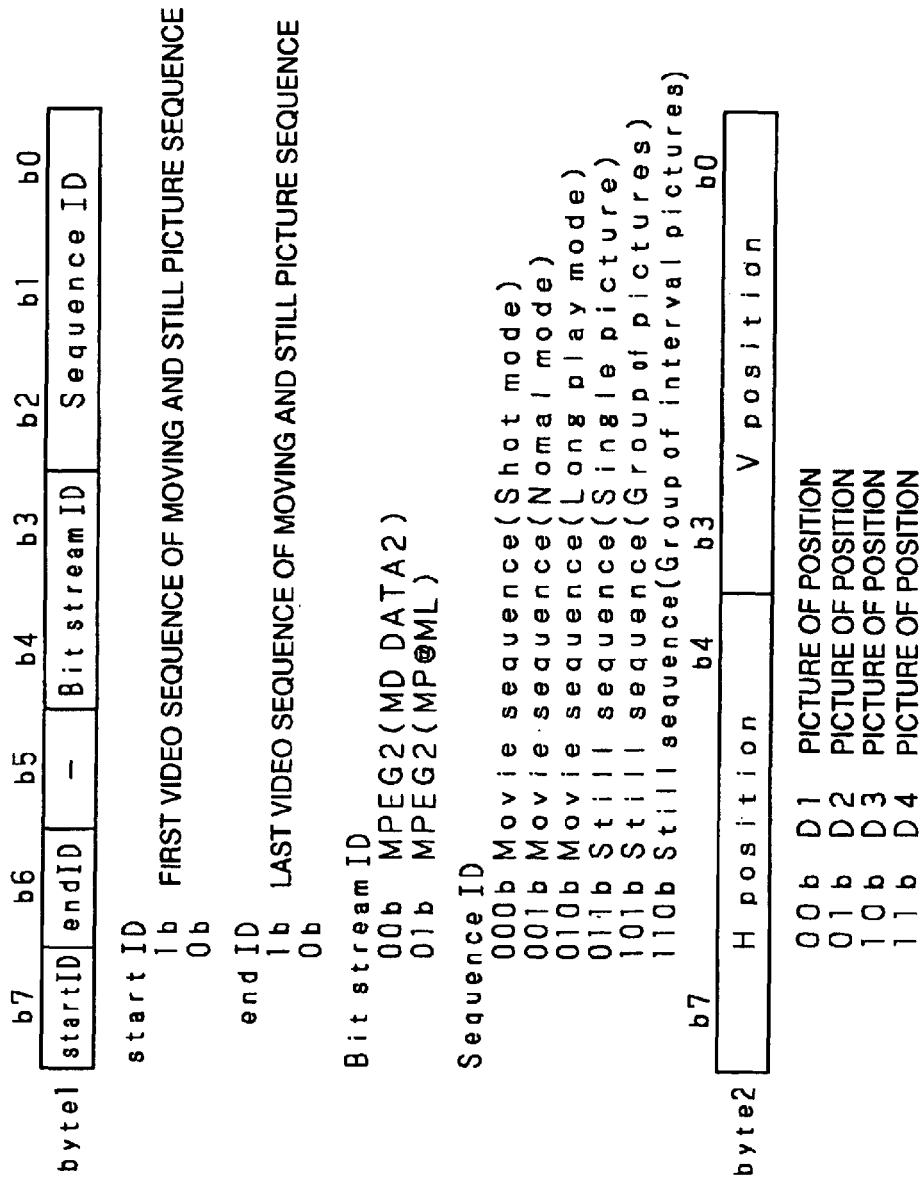
FIG. 8 shows the structure of user data which also has defined the byte 2.

As a newly defined byte 2, shown in FIG. 8, the seventh bit b7 to the fourth bit b4 represent the horizontal position (H position), while the third bit b3 to the 0th bit b0 represent the vertical position (V position).

Figure 9A:
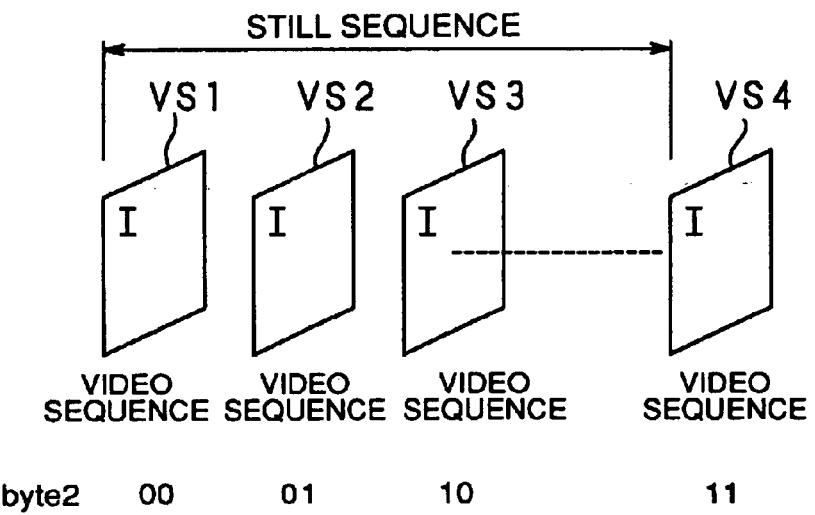
FIG. 9 shows a set of non-consecutive frames.
Figure 9B:
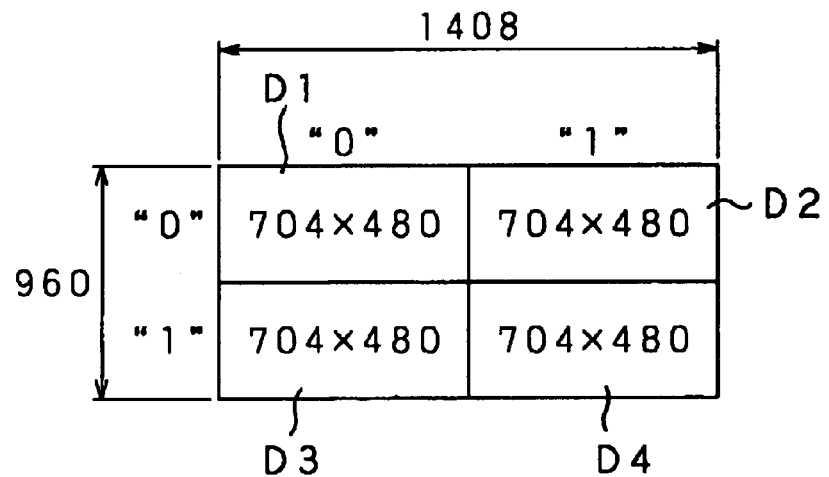

In the still sequence of FIG. 9a, which is a still sequence as a still picture sequence constituted by plural video sequences, '00', '01', '10' and '11' of the byte 2 correspond to the video sequences VS1, VS2, VS3 and VS4, respectively.

As for the four 708×480 pictures, constituting the 1408× 480 pictures making up the 1408×960 large-size picture, the bytes '00', '01', '10' and '11', by definition, are D1, D2, D3 and D4 position pictures, respectively. For reproduction, this byte 2 is checked and encoded to generate the large-size still picture.

That is, in generating a large-size still picture by separately encoding the prescribed sizes, a set of non-consecutive frames of a video sequence is used to retrieve the pictures in the order of D1, D2, D3 and D4 positions, in this order, to represent the large-size still picture.

For distinguishing the time-interval imaging and the large-size still picture of the present invention from each other, the byte 2 of '00' is defined as the time-interval imaging since it is made up only of a D1 position picture.

In the MPEG2, it is provided that the video sequence begins with the sequence header and ends with the sequence end. In this video sequence, the encoding size is determined uniquely.

A picture signal processing apparatus, which splits a large-size picture into small sections and compresses the respective sections, as described above, is now explained. This picture signal processing apparatus is made up of an MPEG encoder shown in FIG. 10 and an MPEG decoder shown in FIG. 11.

Figure 10:
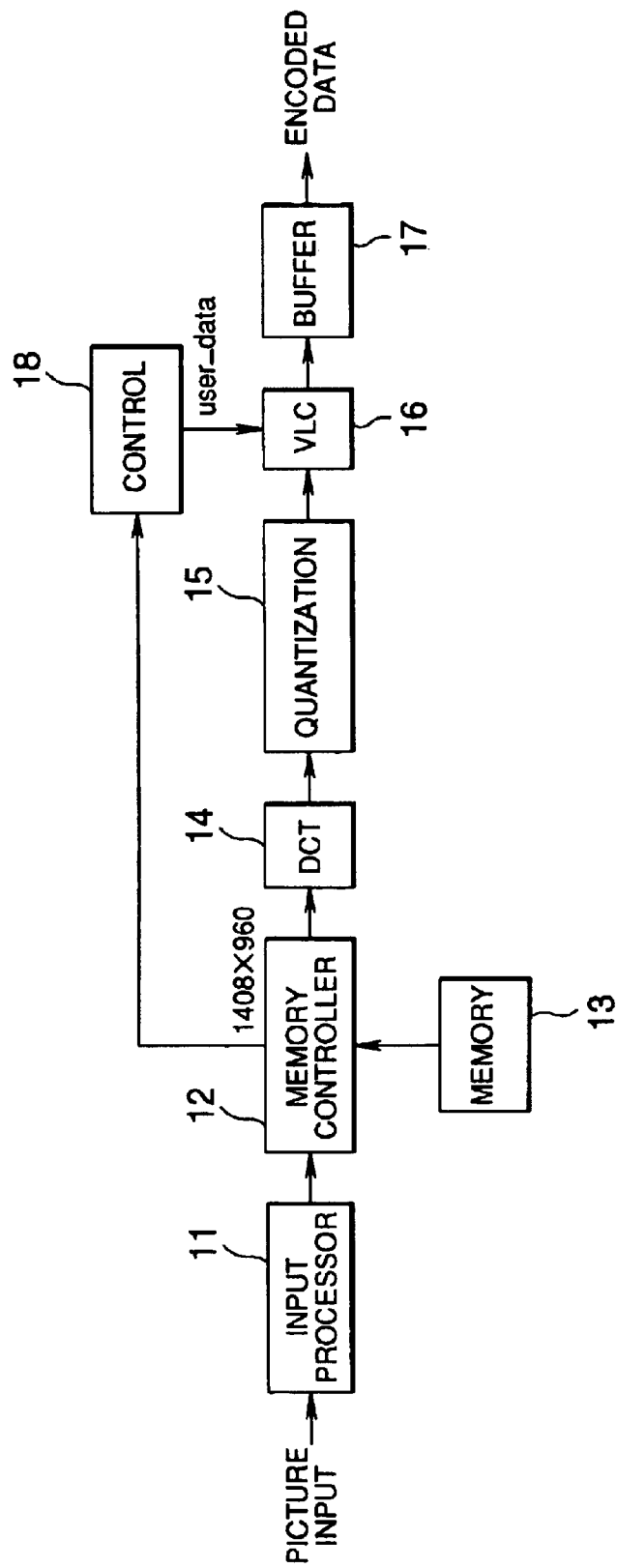
FIG. 10 is a block diagram showing the structure of an MPEG encoder which splits a large size picture.

Referring to FIG. 10, the MPEG encoder includes an input processor 11, for processing an input picture in a pre-set fashion, a memory controller 12 for controlling the memory 13, a discrete cosine transform (DCT) unit 14 for processing signals from the memory controller 12 with discrete cosine transform, and a quantizer 15 for quantizing DCT coefficients from the DCT unit 14.

The input processor 11 A/D converts externally supplied picture signals and allocates I-pictures to sequentially produced frame data to split the frame data on the macro-block basis to output the split frame data. The macro-block is a block of 16 (H) pixels by 16 (V) pixels. Also, in a still picture, only one frame/second is inputted as frame data.

The memory controller 12 causes a picture of, for example, 1408 (H) by 960 (V) pixels, to be stored in the memory 13. From the memory, only pre-set position pictures making up the large-size picture, such as D1, D2, . . . , are sequentially taken out and sent to the variable length encoding. The memory 13 is a frame memory for storing the pictures on the frame basis.

The DCT unit 13 converts the macro-blocks, retrieved from the memory 13, by DCT, to send the DCTed macro-blocks to the quantizer 15.

The quantizer 15 quantizes the DCT coefficients from the DCT unit 13 to send the DCT coefficients to the VLC 16.

The MPEG encoder includes a VLC 16 for variable-length encoding the quantized data from the quantizer 15, a buffer 17 for transiently holding the encoded data from the VLC 16 and a controller 18 for controlling various parts of the MPEG encoder.

The VLC 16 appends user data to the quantized data from the quantizer 15 and variable-length encodes the resulting data in a pre-set fashion to send the resulting encoded data to the buffer 17.

The buffer 17 transiently holds the encoded data from the VLC 16 and outputs the encoded data held therein. The encoded data outputted by the buffer 17 is recorded in a recording/reproducing apparatus, not shown.

The controller 18 controls the various portions of the MPEG encoder. From the memory controller 12, the controller 18 is realized by a so-called micro-computer constituted by, for example, a CPU, a ROM and a RAM.

Figure 11:
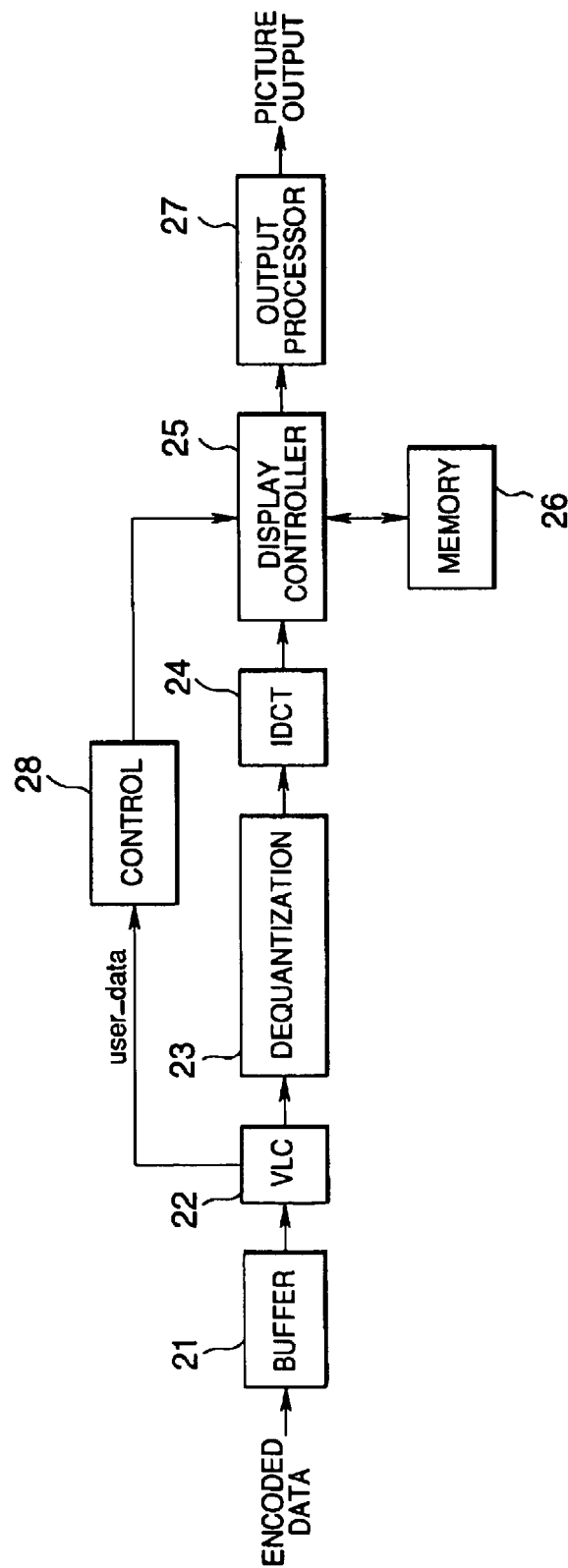
FIG. 11 is a block diagram showing the structure of an MPEG decoder which splits a large-size picture.

Referring to FIG. 11, the MPEG decoder includes a buffer 21 for transient storage of encoded data, a VLD 22 for variable-length decoding the encoded data from the buffer 21, a dequantizer 23 for dequantizing data from the VLD 22, and an inverse DCT unit 24 for inverse DCTing the dequantized data from the dequantizer 23.

The encoded data, reproduced by a recording/reproducing apparatus, not shown, is transiently held in the buffer 21.

The encoded data from the buffer 21 is entered to the VLC 22 where the macro-block encoded information is decoded.

The variable-length decoded data from the VLC 22 are decoded by the dequantizer 23 into DCT coefficients which then are converted by the inverse DCT unit 24 into pixel spatial data.

The MPEG decoder includes a display controller 25 for display-controlling data from the inverse DCT unit 24, a memory 26 for storing a picture, and an output converter 27 for converting data from the display controller to output the converted data as a picture output.

The controller 28 retrieves user data (user_data) from the VLC 22 to send the retrieved data to the display controller 25, which then mixes the D1 to D4 positions, based on the user data, to generate a sole large-size still picture. The memory 26 stores the picture under control by the display controller 25.

The output converter 27 outputs picture signals obtained on D/A conversion of picture data from the display controller 25.

The so-called panoramic synthesis will now be explained. This panoramic synthesis synthesizes a large-size picture from plural pictures having different imaging regions.

Figure 12A:
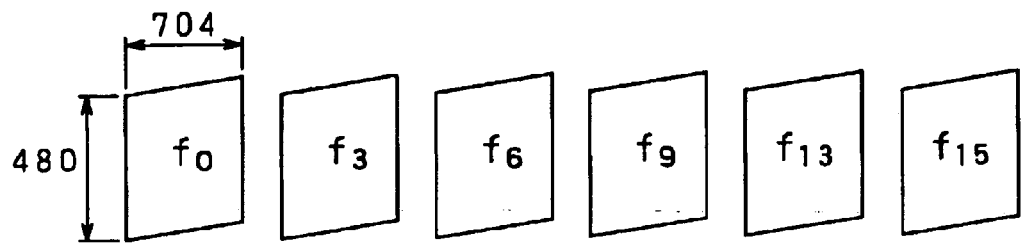
FIG. 12 illustrates panorama synthesis.
Figure 12B:
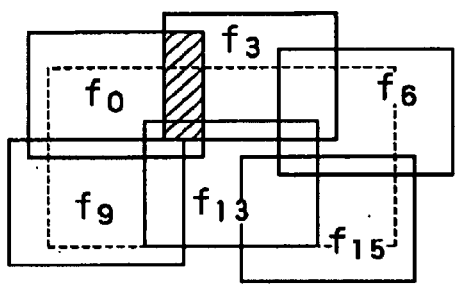
Figure 12C:
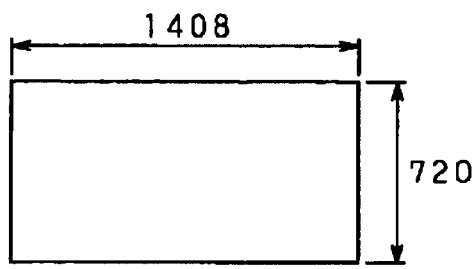

For generating the panoramic synthesis picture by combining plural pictures, the motion vectors of plural 704×360 frames $f_0, f_3, f_6, f_9, \ldots$ shown in FIG. 12A are detected and the positions of these frames $f_0, f_3, f_6, f_9, \ldots$ are verified as shown in FIG. 12B to determine these positions to synthesize a 1408×720 large-size picture as shown in FIG. 12C.

That is, consecutively inputted pictures to the video sequence are handled as moving pictures. The $f_0$–$f_1$–$f_2$ inter-frame motion vectors $MV_0$, $MV_1$, inputted at a rate of, for example, 30 frames per second, are calculated (FIG. 13A). When there is no motion, the inter-frame motion vectors $MV_0$, $MV_1$ are '0'. Then, still pictures are extracted under a pre-set condition, as shown in FIG. 13B. This condition is set, depending on the size of the respective still pictures, so that no gap will be produced between extracted still pictures.

If the recording/reproducing apparatus imaging the pictures is moved slightly, the $f_2-f_3$ inter-frame motion vector $MV_2$ is detected. The motion vector of the entire picture is detected along the x-y direction. The motion vectors correspond to the motion of the recording/reproducing apparatus itself, rather than the object being imaged.

Figure 14:
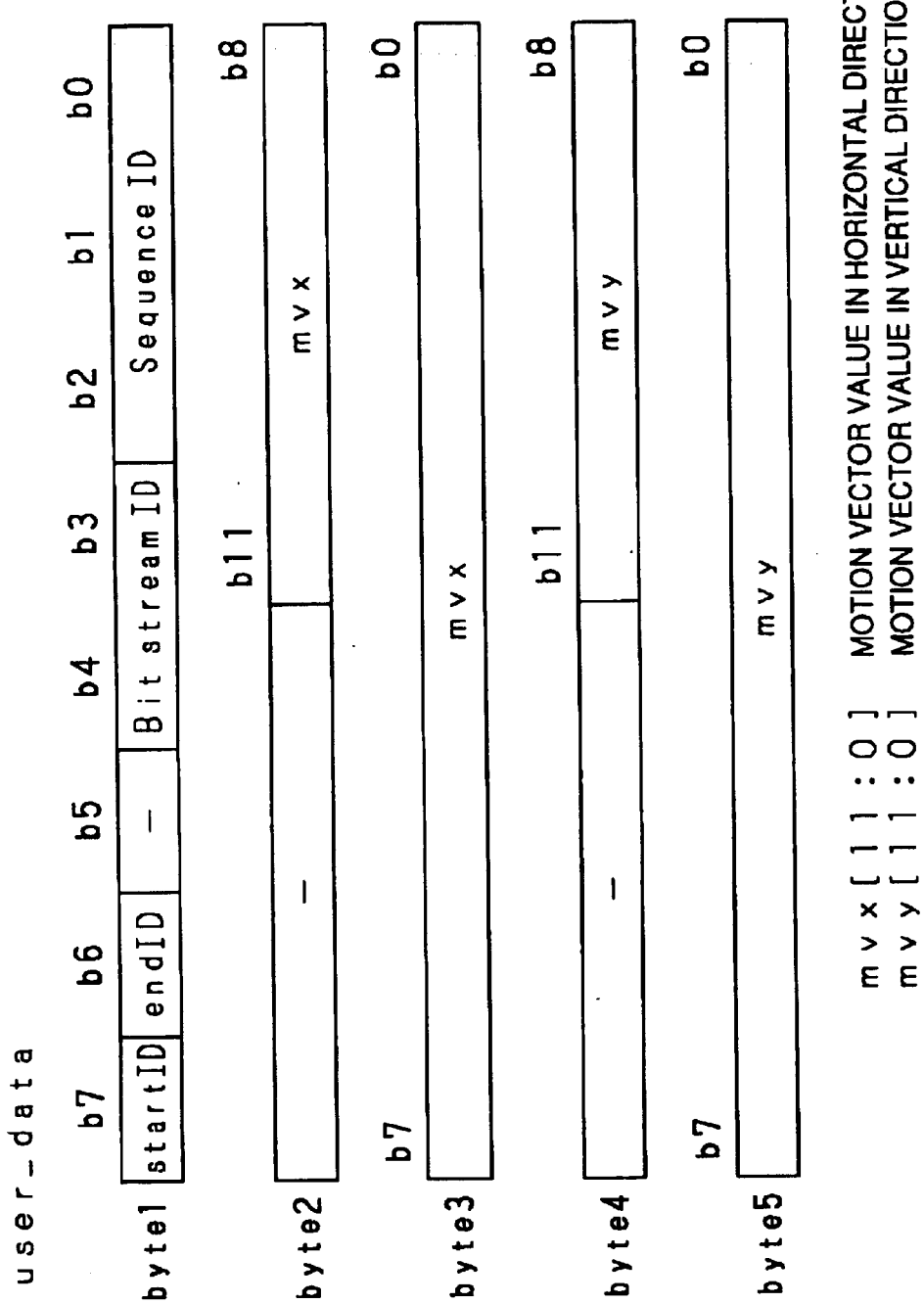
FIG. 14 illustrates the structure of user data as to panorama synthesis.

The motion vectors, thus detected, are written in the user data (user data) of the video sequence. These user data are defined as follows:

In the byte 1 in the user data, shown in FIG. 14, a start ID is the seventh bit b7, an end ID is the sixth bit, bitstream IDs are the third bit b3 and the fourth bit b4, and sequence ID is the second bit b2, a first bit b1 and the 0th bit b0. The fifth bit is reserved. This byte 1 is described above and hence is not explained specifically.

The bytes 2 and 3 of the user data are newly assigned to define mvx, while the bytes 4 and 5 are also assigned to define mvy.

That is, the 0th to 7th bits of the byte 3 and the 8th to 11th bit of the byte 2 are assigned to mvx, while the 0th bit to 7th bit b7 of byte 5 and the 8th bit b8 to the 11th bit b11 of byte 4 are assigned to mvy.

The motion vector values in the horizontal direction are entered to mvx [11:0], while the motion vector values in the vertical direction are entered to mvy [11:0].

For sequentially imaging plural still pictures, the amounts of the motion vectors between respective frames are detected and the amounts of the motion vectors are defined in the user data in the video sequence of the MPEG.

The synthesis of a large-size picture from plural pictures is now explained.

Figure 15:
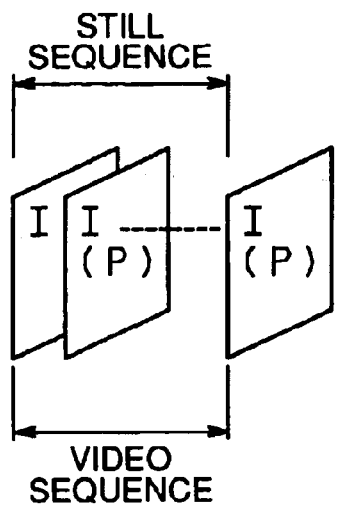
FIG. 15 shows a set of consecutive frames.
Figure 16:
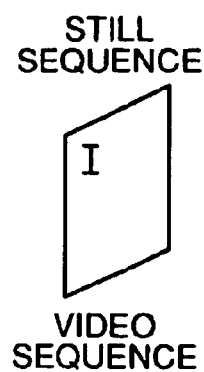
FIG. 16 shows a still sequence constituted by a sole frame.

Referring to FIG. 15, a number of frames of moving pictures are taken and, from these frames of the moving pictures, a still picture is produced. That is, the pictures are recorded as moving pictures during recording and a sole still picture is prepared from several frames of the moving pictures at the time of reproduction.

Specifically, a sole still picture is generated from two consecutive frames at the time of reproduction. That is, if assumed that a CCD solid-state imager of the interlaced scanning system is used for imaging a moving picture, the moving portion is blurred. Thus, two frames are used and the difference between the frames is detected. The moving portions are corrected on the field basis, while non-moving portions are generated from both fields to generate a sole frame.

As described above, the large-sized still picture or the high picture quality still picture, not represented with the MP@ML of MPEG2, according to the present invention, are produced using a set of non-consecutive frames (I-pictures etc) of the previously proposed video sequence.

Specifically, when representing the above-described interval still picture or a thumb-nail still picture, a still picture is represented using an I-picture of MPEG2.

Figure 17:
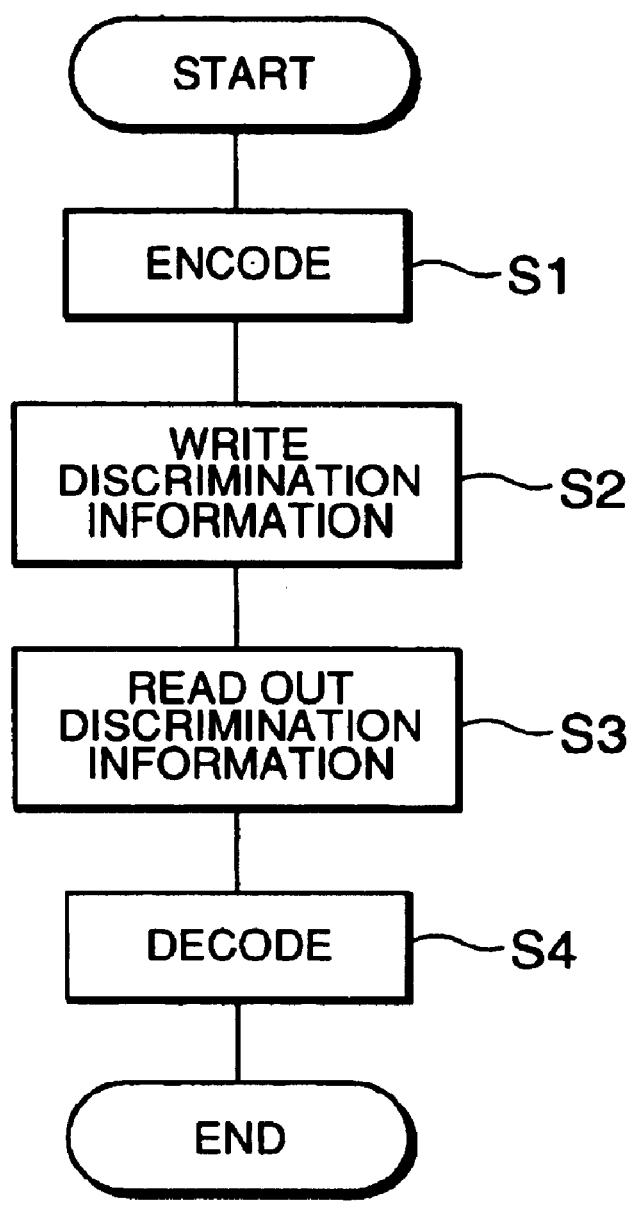
FIG. 17 is a flowchart showing a sequence of process steps of the picture signal processing method.

Referring to the flowchart of FIG. 17, the sequence of process steps of the picture signal processing method is explained. This sequence of process steps encodes/decodes a bitstream according to the MPEG2 encoding standard for picture signals.

At the first step S1, picture signals are encoded to a bitstream. The identification information of the reproducing configuration of the picture signals is recorded at step S2 in a user data (user data) region which is the inherent information provided in a bitstream. The flow then moves to step S3.

At this step S3, the identification information is read out from the inherent information region of the bitstream. At step S4, the picture signals are decoded by the reproducing configuration by the identification information read out at step S3 to terminate the sequence of process steps.

A recording medium, purveyed as a medium for the CD-R or HDD, is explained.

On this recording medium, there are recorded picture signals encoded to a bitstream under the MPEG2 standard described above. In the user data (user_data) region of the recording medium, as the inherent information provided in the bitstream, the identification information for discriminating the reproducing configuration of the moving or still pictures is recorded.

The present invention is not limited to the above-described embodiment. For example, although the television signals of the NTSC system are given in the above-described embodiment as being typical of the picture signals, the present invention is, of course, applicable to other configurations of the picture signals.

What is claimed is:

1. A picture signal processing apparatus comprising:
   extraction means for extracting identification information from an inherent information region provided in a bitstream having a plurality of sequences, wherein at least some of said sequences are moving picture sequences, and said identification information identifies whether at least one picture of a particular sequence is designated to be displayed as at least a portion of a still picture; and
   control means for controlling the display of pictures responsive to the identification information;
   wherein said identification information has a respective value to identify a single picture type still sequence, a group of pictures type still sequence, a group of interval pictures type still sequence, and at least one type of motion picture sequence.

2. The picture processing apparatus according to claim 1 wherein said bitstream has, as a unit, a set of different types of pictures, namely an intra-coded picture, a forward predictive-coded picture, predictive-coded in the forward direction in a display sequence, and a bi-directionally predictive-coded picture, predictive-coded in the forward and backward directions in the display sequence.

3. The picture signal processing apparatus according to claim 1 wherein said identification information contains information for distinguishing between different types of moving pictures and different types of still pictures.

4. The picture signal processing apparatus according to claim 1 wherein said identification information contains information specifying that a single still picture is to be produced from a plurality of frames of moving pictures of said sequence.

5. The picture signal processing apparatus according to claim 1 wherein said identification information contains information specifying that a still picture of said sequence is to be displayed as part of a sequence of still pictures imaged at intervals in the range of one second to thirty minutes.

6. The picture signal processing apparatus according to claim 1 wherein said identification information designates at least one of the display by plural pictures imaged at a pre-set time interval, display by thumb-nail pictures, extracted from the moving picture, display by a large-size picture split into a plurality of picture sections, or the display of a large-size picture constituted by synthesizing plural picture sections made up of moving regions being imaged.

7. The picture signal processing apparatus according to claim 6 wherein said identification information contains the information concerning the amount of movement when plural picture sections made up of moving regions being imaged are synthesized to build a large-size picture.

8. The picture signal processing apparatus according to claim 6 wherein said identification information contains the position information of the picture sections making up the large-size picture if said identification information is recorded in the respective picture sections split from the large-sized picture.

9. The picture signal processing apparatus according to claim 1 wherein said bitstream is provided in the MPEG (Moving Pictures Experts Group) 2 standard and wherein said sequence is the video sequence defined in said MPEG2 standard.

10. A picture signal processing method comprising:
extracting identification information, from an inherent information region provided in a bitstream having a plurality of sequences, wherein at least some of said sequences are moving picture sequences, and said identification information identifies whether at least one picture of a particular sequence is designated to be displayed as at least a portion of a still picture; and
controlling the display of pictures responsive to the identification information;
wherein said identification information has a respective value to identify a single picture type still sequence, a group of pictures type still sequence, a group of interval pictures type still sequence, and at least one type of motion picture sequence.

11. The picture processing method according to claim 10 wherein said bitstream has, as a unit, a set of different types of pictures, namely an intra-coded picture, a forward predictive-coded picture, predictive-coded in the forward direction in a display sequence, and a bi-directionally predictive-coded picture, predictive-coded in the forward and backward directions in the display sequence.

12. The picture signal processing method according to claim 10 wherein said identification information contains information for distinguishing between different types of moving pictures and different types of still pictures.

13. The picture signal processing method according to claim 10 wherein said identification information contains information specifying that a single still picture is to be produced from a plurality of frames of moving pictures of said sequence.

14. The picture signal processing apparatus according to claim 10 wherein said identification information contains information specifying that a still picture of said sequence is to be displayed as part of a sequence of still pictures imaged at intervals in the range of one second to thirty minutes.

15. The picture signal processing apparatus according to claim 10 wherein said identification information designates at least one of the display by plural pictures imaged at a pre-set time interval, display by thumb-nail pictures, extracted from the moving picture, display by a large-size picture split into a plurality of picture sections, or the display of a large-size picture constituted by synthesizing plural picture sections made up of moving regions being imaged.

16. The picture signal processing method according to claim 15 wherein said identification information contains the information concerning the amount of movement when plural picture sections made up of moving regions being imaged are synthesized to build a large-size picture.

17. The picture signal processing method according to claim 15 wherein said identification information contains the position information of the picture sections making up the large-size picture if said identification information is recorded in the respective picture sections split from the large-sized picture.

18. The picture signal processing method according to claim 10 wherein said bitstream is provided in the MPEG (Moving Pictures Experts Group) 2 standard and wherein said sequence is the video sequence defined in said MPEG2 standard.

19. A picture signal processing apparatus comprising:
supplying means for supplying identification information for designating whether at least one picture of a particular sequence of a plurality of sequences is to be displayed as at least a portion of a still picture, wherein at least some of said sequences are moving picture sequences; and
inserting means for inserting said identification information into an inherent information region provided in a bitstream having said plurality of sequences;
wherein said identification information has a respective value to identify a single picture type still sequence, a group of pictures type still sequence, a group of interval pictures type still sequence, and at least one type of motion picture sequence.

20. The picture processing apparatus according to claim 19 wherein said bitstream has, as a unit, a set of different types of pictures, namely an intra-coded picture, a forward predictive-coded picture, predictive-coded in the forward direction in a display sequence, and a bi-directionally predictive-coded picture, predictive-coded in the forward and backward directions in the display sequence.

21. The picture signal processing apparatus according to claim 20 wherein said identification information contains information for distinguishing between different types of moving pictures and different types of still pictures.

22. The picture signal processing apparatus according to claim 20 wherein said identification information contains information specifying that a single still picture is to be produced from a plurality of frames of moving pictures of said sequence.

23. The picture signal processing apparatus according to claim 20 wherein said identification information contains information specifying that a still picture of said sequence is to be displayed as part of a sequence of still pictures imaged at intervals in the range of one second to thirty minutes.

24. The picture signal processing apparatus according to claim 20 wherein said identification information designates at least one of the display by plural pictures imaged at a pre-set time interval, display by thumb-nail pictures, extracted from the moving picture, display by a large-size picture split into a plurality of picture sections, or the display of a large-size picture constituted by synthesizing plural picture sections made up of moving regions being imaged.

25. The picture signal processing apparatus according to claim 24 wherein said identification information contains the information concerning the amount of movement when plural picture sections made up of moving regions being imaged are synthesized to build a large-size picture.

26. The picture signal processing method according to claim 24 wherein said identification information contains the position information of the picture sections making up the large-size picture if said identification information is recorded in the respective picture sections split from the large-sized picture.

27. A picture signal processing method comprising:
supplying identification information for designating whether at least one picture of a particular sequence of a plurality of sequences is to be displayed as at least a portion of a still picture, wherein at least some of said sequences are moving picture sequences; and
inserting said identification information into an inherent information region provided in a bitstream having said plurality of sequences;

wherein said identification information has a respective value to identify a single picture type still sequence, a group of pictures type still sequence, a group of interval pictures type still sequence, and at least one type of motion picture sequence.

28. The picture processing method according to claim 27 wherein said bitstream has, as a unit, a set of different types of pictures, namely an intra-coded picture, a forward predictive-coded picture, predictive-coded in the forward direction in a display sequence, and a bi-directionally predictive-coded picture, predictive-coded in the forward and backward directions in the display sequence.

29. The picture signal processing method according to claim 27 wherein said identification information contains information for distinguishing between different types of moving pictures and different types of still pictures.

30. The picture signal processing method according to claim 27 wherein said identification information contains information specifying that a single still picture is to be produced from a plurality of frames of moving pictures of said sequence.

31. The picture signal processing method according to claim 27 wherein said identification information contains information specifying that a still picture of said sequence is to be displayed as part of a sequence of still pictures imaged at intervals in the range of one second to thirty minutes.

32. The picture signal processing method according to claim 27 wherein said identification information designates at least one of the display by plural pictures imaged at a pre-set time interval, display by thumb-nail pictures, extracted from the moving picture, display by a large-size picture split into a plurality of picture sections, or the display of a large-size picture constituted by synthesizing plural picture sections made up of moving regions being imaged.

33. The picture signal processing method according to claim 32 wherein said identification information contains the information concerning the amount of movement when plural picture sections made up of moving regions being imaged are synthesized to build a large-size picture.

34. The picture signal processing method according to claim 32 wherein said identification information contains the position information of the picture sections making up the large-size picture if said identification information is recorded in the respective picture sections split from the large-sized picture.

35. The picture signal processing method according to claim 28 wherein said bitstream is provided in the MPEG (Moving Pictures Experts Group) 2 standard and wherein said sequence is the video sequence defined in said MPEG2 standard.

36. A recording medium having recorded therein a bitstream corresponding to encoded picture signals, said bitstream having a plurality of sequences, at least some of said sequences being moving picture sequences; wherein identification information is recorded in an inherent information region provided in the bitstream, said identification information designating whether at least one picture of a particular one of said sequences is to be displayed as at least a portion of a still picture;

wherein said identification information has a respective value to identify a single picture type still sequence, a group of pictures type still sequence, a group of interval pictures type still sequence, and at least one type of motion picture sequence.

37. The recording medium according to claim 36 wherein said bitstream has, as a unit, a set of different types of pictures, namely an intra-coded picture, a forward predictive-coded picture, predictive-coded in the forward direction in a display sequence, and a bi-directionally predictive-coded picture, predictive-coded in the forward and backward directions in the display sequence.

38. The recording medium according to claim 36 wherein said identification information contains information for distinguishing between different types of moving pictures and different types of still pictures.

39. The recording medium according to claim 36 wherein said identification information contains information specifying that a single still picture is to be produced from a plurality of frames of moving pictures of said sequence.

40. The recording medium according to claim 36 wherein said identification information contains information specifying that a still picture of said sequence is to be displayed as part of a sequence of still pictures imaged at intervals in the range of one second to thirty minutes.

41. The recording medium according to claim 36 wherein said identification information designates at least one of the display by plural pictures imaged at a pre-set time interval, display by thumb-nail pictures, extracted from the moving picture, display by a large-size picture split into a plurality of picture sections, or the display of a large-size picture constituted by synthesizing plural picture sections made up of moving regions being imaged.

42. The recording medium according to claim 41 wherein said identification information contains the information concerning the amount of movement when plural picture sections made up of moving regions being imaged are synthesized to build a large-size picture.

43. The recording medium according to claim 41 wherein said identification information contains the position information of the picture sections making up the large-size picture if said identification information is recorded in the respective picture sections split from the large-sized picture.

44. The recording medium according to claim 36 wherein said bitstream is provided in the MPEG (Moving Pictures Experts Group) 2 standard and wherein said sequence is the video sequence defined in said MPEG2 standard.

* * * * *